United States Patent
Harrop et al.

(10) Patent No.: US 11,827,489 B1
(45) Date of Patent: Nov. 28, 2023

(54) INTERCHANGEABLE TARP DEPLOYMENT SYSTEM

(71) Applicant: Con-Wal, Inc., Rogers, AR (US)

(72) Inventors: Shannon Dean Harrop, Springdale, AR (US); James Alan Hughes, Monett, MO (US)

(73) Assignee: Con-Wal, Inc., Rogers, AR (US)

( * ) Notice: Subject to any disclaimer, the term of this patent is extended or adjusted under 35 U.S.C. 154(b) by 65 days.

(21) Appl. No.: 17/222,602

(22) Filed: Apr. 5, 2021

Related U.S. Application Data

(60) Provisional application No. 63/006,940, filed on Apr. 8, 2020.

(51) Int. Cl.
    *B65H 75/42*     (2006.01)
    *B65H 75/44*     (2006.01)

(52) U.S. Cl.
    CPC ....... *B65H 75/425* (2013.01); *B65H 75/4489* (2013.01); *B65H 2701/19* (2013.01)

(58) Field of Classification Search
None
See application file for complete search history.

(56) References Cited

U.S. PATENT DOCUMENTS

| | | | | |
|---|---|---|---|---|
| 987,593 A * | 3/1911 | O'Maley | ................ | B65H 75/40 242/395 |
| 1,106,624 A | 8/1914 | Cadwallader et al. | | |
| 2,403,031 A * | 7/1946 | Stanley | ............. | D01D 10/0454 242/366.4 |
| 2,413,061 A | 12/1946 | McKee et al. | | |
| 2,754,900 A | 7/1956 | Karobonik et al. | | |
| 3,279,281 A * | 10/1966 | Anderson | ............... | F16H 27/06 74/820 |
| 3,301,498 A | 1/1967 | Greding | | |
| 3,451,605 A * | 6/1969 | Hanson | .................. | B65H 20/00 226/76 |
| 3,473,755 A * | 10/1969 | Brown | .................... | A63C 19/12 242/399.1 |
| 3,481,556 A * | 12/1969 | McDonnell | ............ | A01G 20/12 242/388.6 |
| 3,721,132 A * | 3/1973 | Johnson | .................. | F16H 35/02 475/182 |
| 3,913,854 A * | 10/1975 | McClure | ............... | E01C 19/522 242/559.3 |

(Continued)

FOREIGN PATENT DOCUMENTS

| | | |
|---|---|---|
| CN | 205312715 | 6/2016 |
| CN | 110436266 | 11/2019 |

(Continued)

*Primary Examiner* — William A. Rivera
(74) *Attorney, Agent, or Firm* — Head, Johnson, Kachigian & Wilkinson, PC

(57) ABSTRACT

A tarp deployment system for unwinding and taking up a flexible tarpaulin. The system includes a tarp deployment machine and a spool configured to receive and retain a flexible tarpaulin. A spool gear extends radially from at least one end of the spool. A cylindrical cage has a series of parallel shafts parallel to an axis shaft of the cage. A cage gear extends from the cage axis shaft and a drive mechanism drives the cage gear in order to rotate the spool. Power is transmitted to the cage gear which then rotates the cylindrical cage which engages and rotates the spool gear.

11 Claims, 7 Drawing Sheets

(56) References Cited

U.S. PATENT DOCUMENTS

| | | | |
|---|---|---|---|
| 4,050,972 A | 9/1977 | Cardinal, Jr. | |
| 4,068,404 A | 1/1978 | Sheldon | |
| 4,084,763 A * | 4/1978 | Zamboni | A01G 20/18 |
| | | | 242/399.1 |
| 4,253,619 A * | 3/1981 | Corderoy | A01G 25/09 |
| | | | 242/397.2 |
| 4,307,629 A * | 12/1981 | Moller | F16H 3/74 |
| | | | 74/403 |
| 4,455,790 A | 6/1984 | Curle | |
| 4,494,707 A * | 1/1985 | Niibori | A01G 9/227 |
| | | | 242/390.8 |
| 4,578,908 A | 4/1986 | Ishler | |
| 4,590,714 A | 5/1986 | Walker | |
| 4,927,317 A | 5/1990 | Acosta | |
| 5,180,203 A | 1/1993 | Goudy | |
| 5,265,671 A * | 11/1993 | Vowles | B65H 75/4413 |
| | | | 165/95 |
| 5,291,698 A | 3/1994 | Rayner, Jr. | |
| 5,304,014 A * | 4/1994 | Slutz | B09B 1/004 |
| | | | 405/270 |
| 5,524,302 A * | 6/1996 | Ragsdale | E04H 4/101 |
| | | | 4/502 |
| 5,535,955 A | 7/1996 | Enger et al. | |
| 5,536,116 A | 7/1996 | Lammers et al. | |
| 5,620,281 A * | 4/1997 | Lammers | C08K 3/013 |
| | | | 405/129.75 |
| 5,630,735 A | 5/1997 | Eckert | |
| 5,660,402 A | 8/1997 | Jones et al. | |
| 5,692,491 A | 12/1997 | Christensen et al. | |
| 5,765,901 A | 6/1998 | Wilkens | |
| 6,007,138 A | 12/1999 | Cramaro | |
| 6,142,554 A | 11/2000 | Carroll et al. | |
| 6,145,778 A | 11/2000 | Tuominen et al. | |
| 6,264,400 B1 | 7/2001 | Gent | |
| 6,299,094 B1 * | 10/2001 | James, Jr. | E02B 3/121 |
| | | | 242/399.1 |
| 6,502,890 B1 | 1/2003 | Fliege et al. | |
| 6,558,079 B1 | 5/2003 | Kozak et al. | |
| 6,558,080 B2 | 5/2003 | Kozak | |
| 6,575,393 B1 | 6/2003 | James, Jr. | |
| 6,786,676 B1 | 9/2004 | Pitcher | |
| 6,865,754 B2 | 3/2005 | MacLean et al. | |
| 6,981,734 B2 | 1/2006 | Martin | |
| 7,018,135 B2 | 3/2006 | Kaul et al. | |
| 7,367,606 B2 | 5/2008 | Ellis | |
| 7,404,582 B2 | 7/2008 | Scartozzi et al. | |
| 7,458,629 B2 | 12/2008 | Smith et al. | |
| 7,677,243 B2 | 3/2010 | McClendon | |
| 8,028,483 B2 | 10/2011 | Carolan | |
| 8,172,972 B2 | 5/2012 | Carolan | |
| 8,191,547 B2 | 6/2012 | Pellegrino | |
| 8,205,393 B1 * | 6/2012 | Harrop | B09B 1/004 |
| | | | 405/129.9 |
| 8,375,643 B1 | 2/2013 | Harrop et al. | |
| 8,607,781 B2 | 12/2013 | Hermann et al. | |
| 8,784,007 B2 | 7/2014 | Wilson | |
| 8,863,741 B2 | 10/2014 | MacKay et al. | |
| 9,206,997 B2 | 12/2015 | Ryan | |
| D813,801 S | 3/2018 | Wabel et al. | |
| 9,908,264 B2 * | 3/2018 | Morris | A01G 13/0287 |
| 10,499,571 B2 | 12/2019 | Kitchen et al. | |
| 2003/0124915 A1 | 7/2003 | Kaine et al. | |
| 2004/0107985 A1 | 6/2004 | Weeks | |
| 2004/0131454 A1 | 7/2004 | Voghel | |
| 2005/0211238 A1 | 9/2005 | Archibald | |
| 2006/0010783 A1 | 1/2006 | Evans | |
| 2006/0065182 A1 | 3/2006 | Campbell et al. | |
| 2007/0102951 A1 | 5/2007 | Chenowth | |
| 2007/0266644 A1 | 11/2007 | Weicht | |
| 2008/0141599 A1 | 6/2008 | Akdag et al. | |
| 2008/0277961 A1 | 11/2008 | Smith et al. | |
| 2008/0296186 A1 | 12/2008 | Daun et al. | |
| 2009/0013610 A1 | 1/2009 | Glynos | |
| 2009/0194095 A1 | 8/2009 | Fairstein | |
| 2010/0047020 A1 | 2/2010 | Lacey | |
| 2010/0074688 A1 | 3/2010 | Renaud | |
| 2010/0278592 A1 | 11/2010 | Walker | |
| 2011/0180058 A1 | 7/2011 | MacKay et al. | |
| 2011/0227363 A1 | 9/2011 | Smith et al. | |
| 2014/0137401 A1 | 5/2014 | Lannert | |
| 2018/0283522 A1 * | 10/2018 | Vaslin | F16D 3/185 |

FOREIGN PATENT DOCUMENTS

| | | |
|---|---|---|
| DE | 3330897 | 3/1985 |
| DE | 19913750 | 10/2000 |
| EP | 497179 | 8/1992 |
| GB | 2278374 | 11/1994 |
| JP | 04281907 | 10/1992 |
| JP | 2000167506 | 6/2000 |
| JP | 2008143700 | 6/2008 |
| WO | 199950000 | 10/1999 |

* cited by examiner

INTERCHANGEABLE TARP DEPLOYMENT SYSTEM

CROSS-REFERENCE TO RELATED APPLICATIONS

This application is based on and claims priority to U.S. Provisional Patent Application Ser. No. 63/006,940, filed Apr. 8, 2020, which is incorporated herein in its entirety by reference.

BACKGROUND OF THE INVENTION

Field of the Invention

The present invention is directed to a tarpaulin deployment system for unwinding and taking up a flexible tarpaulin from a spool wherein a tarpaulin and its spool may efficiently and safely be removed and replaced with another tarpaulin and spool.

Related Art

Various types of large flexible tarpaulins are utilized for a wide variety of applications, including as landfill covers. By way of example, the active site of a landfill is covered with a tarpaulin or tarpaulins at the end of each day and then the tarpaulin is removed at the beginning of the next day.

Machines have been developed over the years to wind the tarpaulin on a spool or reel at the beginning of the day and then unwind the tarpaulin from the spool or reel at the end of the day. These machines may be moved by and mounted to vehicles such as a dozer, a tractor, a backhoe, a compactor, or other heavy equipment. The spools are mechanically wound and unwound by a motor, such as a motor driven by hydraulic power.

The tarpaulins may be stored on spools or reels so that when multiple tarpaulins are needed, a new tarpaulin wound on its spool or reel is mounted on the tarp deployment machine for use.

U.S. Pat. No. 5,304,014 and U.S. Pat. Publ. No. 2004/0131454 each show examples of prior art machinery developed for unwinding and taking up a flexible tarpaulin. Applicant's prior U.S. Pat. Nos. 8,375,643 and 8,205,393 show examples of a flexible tarpaulin and a weight system therefor.

Notwithstanding the foregoing, there remains a need for a tarp deployment system wherein a tarpaulin and its accompanying spool may be mounted and dismounted to and from the tarp deployment machine efficiently and safely with minimum effort.

There also remains a need for a tarp deployment system which will accommodate a variety of different tarp and spool designs.

SUMMARY OF THE INVENTION

The present invention is directed to an interchangeable tarp deployment system utilized for unwinding and for taking up of a flexible tarpaulin. The tarpaulin will be connected at one end to a tarp deployment machine and, in particular, to a spool configured to receive and retain a flexible tarpaulin thereon.

The tarp deployment machine is removably attached to a powered vehicle, such as a bulldozer, a dozer, a tractor, a backhoe, a compactor, or other heavy equipment.

The tarp deployment machine may include a frame having frame members and may include a pair of connecting brackets to removably attach the tarp deployment machine to the powered vehicle.

A spool gear extends radially from one end of the spool. The spool gear has a series of teeth extending around the circumference of the spool gear.

A cylindrical cage is rotatably retained in the housing in the tarp deployment machine. The cylindrical cage includes a series of parallel shafts parallel to and spaced from an axis shaft of the cylindrical cage. The cylindrical cage engages the spool gear.

A cage gear extends radially from a cylindrical cage axis shaft and is rotatably driven by a drive mechanism. The drive mechanism may include a continuous chain which engages a cage gear and is driven by a drive gear powered by a hydraulic motor.

A pair of lower arms each include a cradle to receive the spool. The lower arms are pivotally connected to the frame and are raised and lowered by lower arm hydraulic cylinders.

A pair of upper arms each include a recess in order to surround and retain the spool. The upper arms are pivotally connected to the frame and are moved by a pair of upper arm hydraulic cylinders.

In an alternate embodiment, the system will accommodate and be compatible with a different spool and different spool configuration. The spool terminates in a cylindrical hub having a recess slot or drive bore to receive a drive lug or drive shaft driven by a hydraulic motor. A cylindrical cap is secured over the end of the spool. A spool gear is fastened to the cylindrical end cap with a series of fasteners. As in the previous embodiment, power is transmitted from a motor to a cage gear which rotates a cylindrical cage. The cylindrical cage engages and rotates the spool gear.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
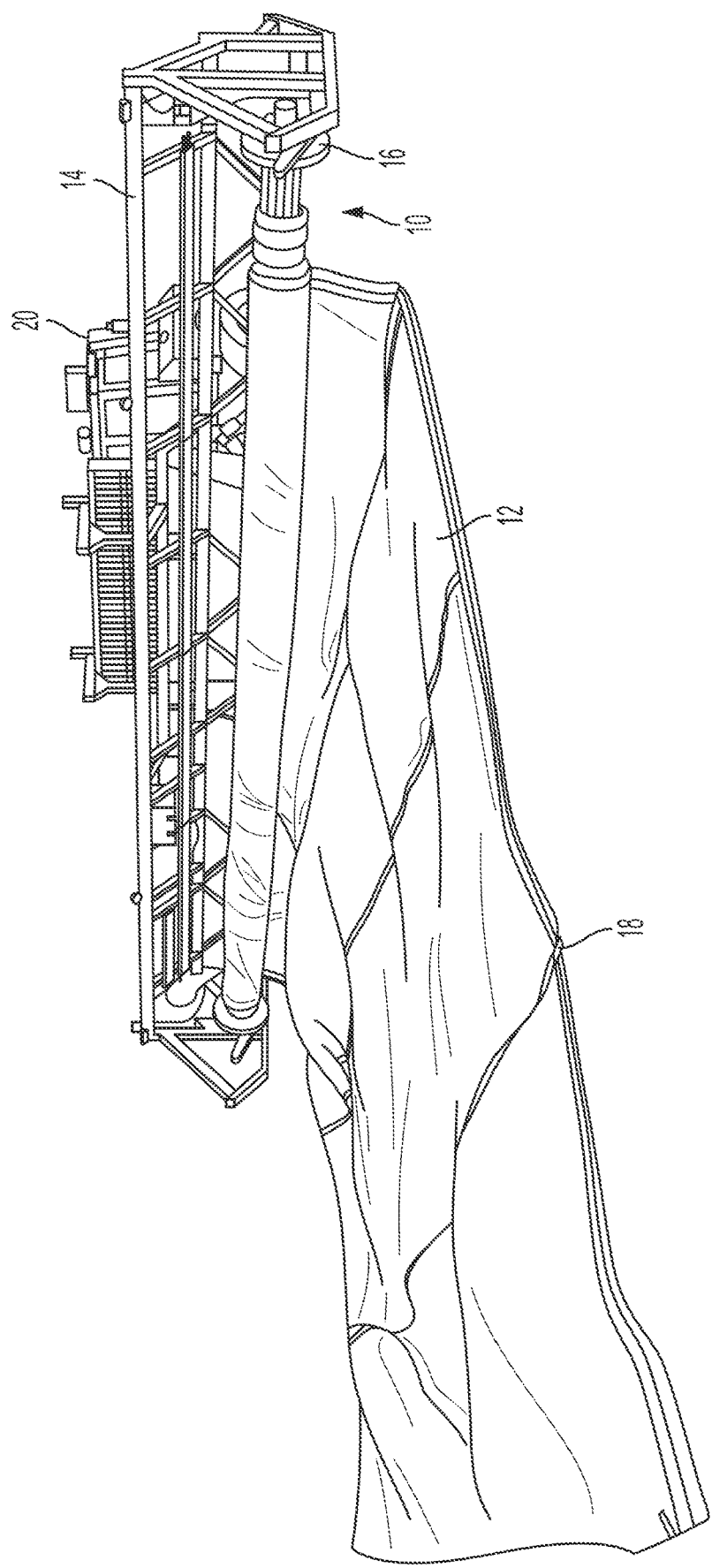
FIG. 1 illustrates a simplified schematic diagram of an interchangeable tarp deployment system including a tarp deployment machine constructed in accordance with the present invention along with a powered vehicle.

Referring to the drawings in detail, FIG. 1 illustrates a simplified schematic diagram of an interchangeable tarp deployment system 10 constructed in accordance with the present invention.

As will be described in detail, the system 10 is utilized for unwinding and for taking up a flexible tarpaulin 12. The tarpaulin 12 may be constructed of polypropylene or another sturdy fabric. The tarpaulin 12 may be of various dimensions. For example, a forty foot (40') by one-hundred foot (100') tarp may be utilized. In addition, more than one tarp may be connected together.

The tarp 12 is connected at one end to a tarp deployment machine 14 which will be described in detail. The tarp deployment machine includes a spool 16 configured to receive and retain the flexible tarpaulin 12. The spool is substantially cylindrical and the tarp is wound around the spool.

The tarpaulin 12 may include a weight system 18 as described in detail in Applicant's U.S. Pat. Nos. 8,375,643 and 8,205,393.

The tarp deployment machine 14 is removably attached to a powered vehicle 20, such as a bulldozer or dozer, a tractor, a backhoe, a compactor, or other heavy equipment.

Figure 2:
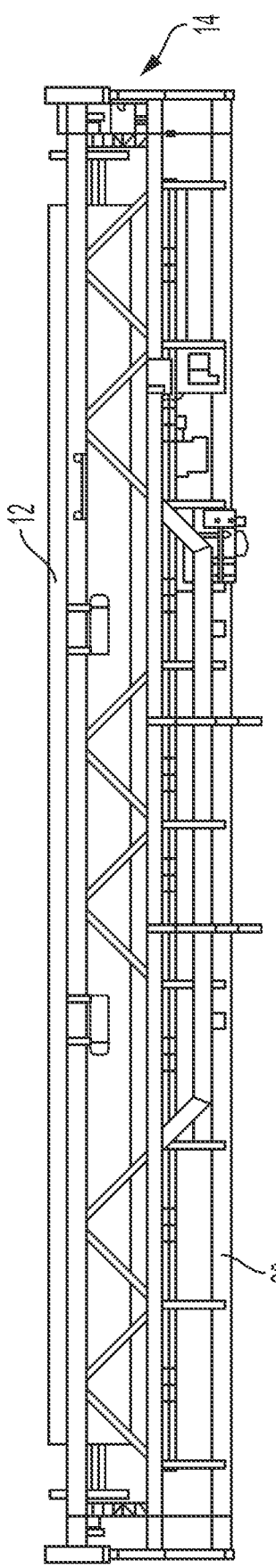
FIGS. 2, 3, and 4 illustrate alternate views of the tarp deployment machine apart from the powered vehicle with a tarpaulin mounted and wound on the tarp deployment machine.
Figure 3:
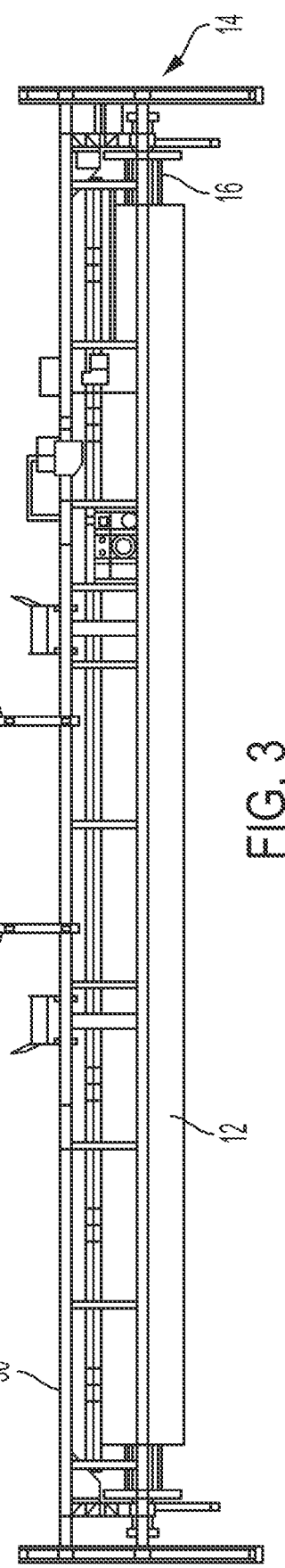
Figure 4:
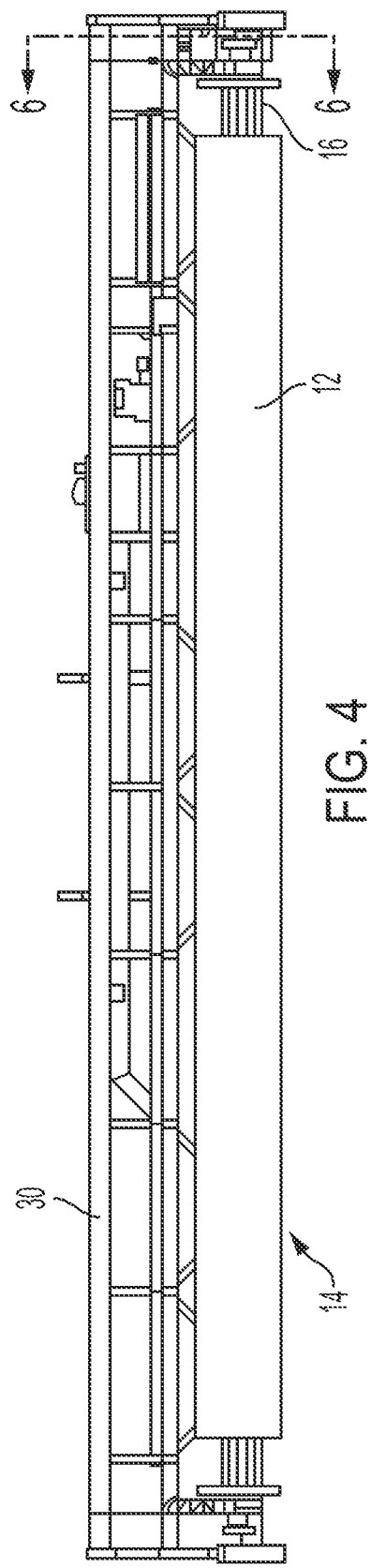

FIGS. 2, 3, and 4 illustrate alternate views of the tarp deployment machine 14 apart from the powered vehicle 20 with a tarpaulin 12 mounted and wound on the tarp deployment machine.

Figure 6:
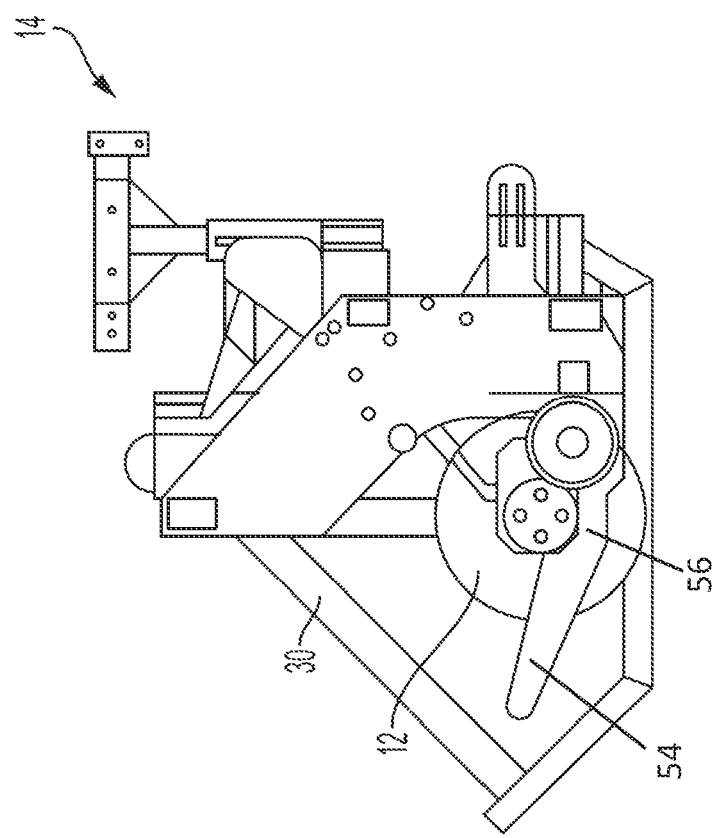
FIG. 6 illustrates a sectional view taken along section line 6-6 of FIG. 4.
Figure 5:
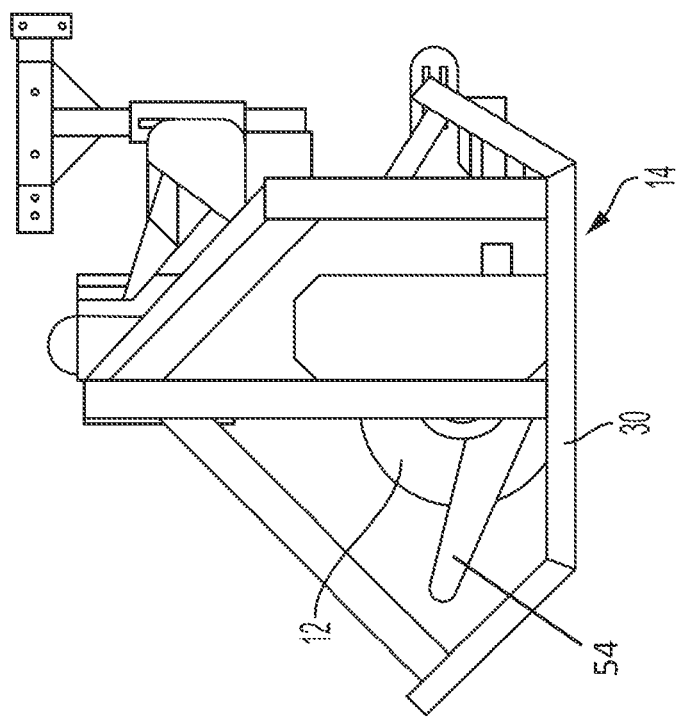
FIG. 5 illustrates an end view of the tarp deployment machine.

FIG. 5 illustrates an end view of the tarp deployment machine 14 while FIG. 6 illustrates a sectional view taken along section line 6-6 of FIG. 4.

The tarp deployment machine 14 may include a frame having frame members 30 and may include a pair of connecting brackets 32 to removably attach the tarp deployment machine 14 to the powered vehicle 20.

Figure 7:
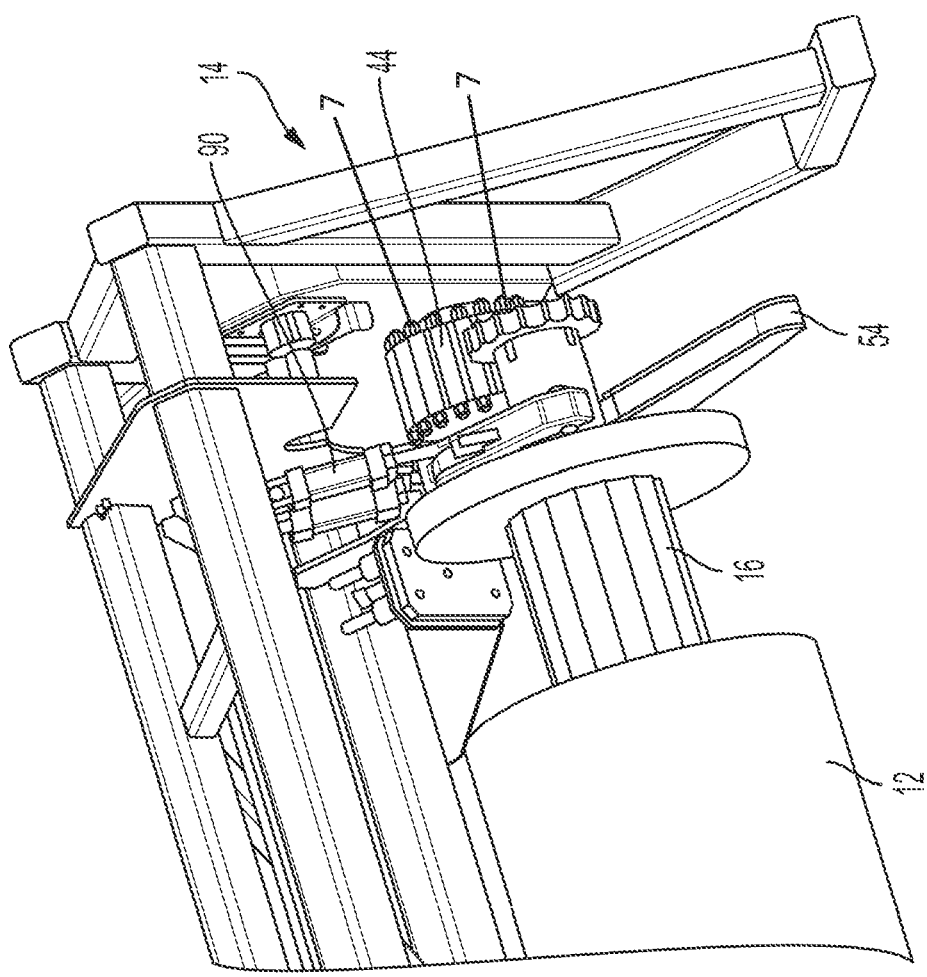
FIG. 7 illustrates a perspective view of a portion of the tarp deployment machine and the spool.

FIG. 7 illustrates a perspective view of a portion of the tarp deployment machine 14 and the spool 16.

Figure 8:
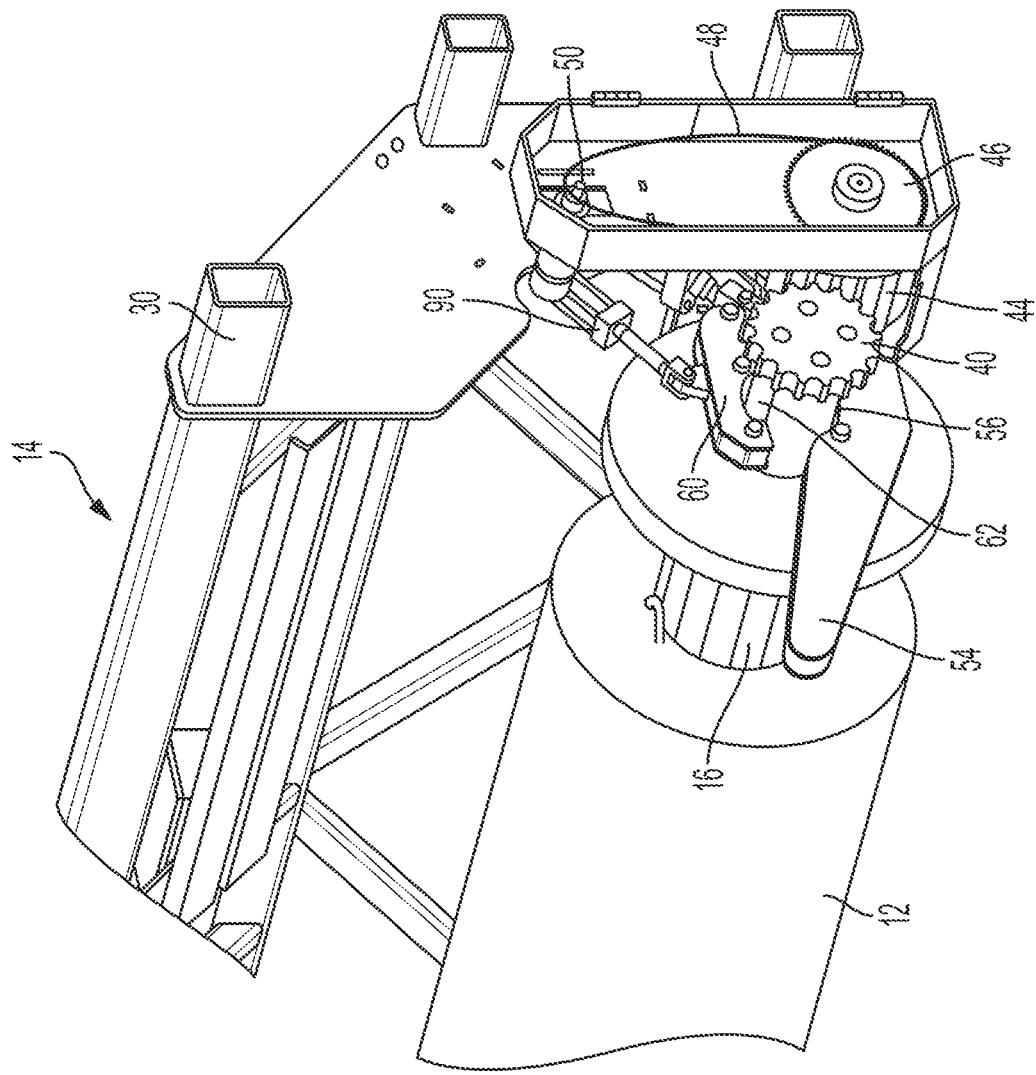
FIG. 8 is an alternate perspective view of the tarp deployment machine as shown in FIG. 7 with a portion of the frame members removed for ease of viewing.

FIG. 8 is an alternate perspective view as shown in FIG. 7 with a portion of the frame members 30 removed for clarity.

A spool gear 40 extends radially from one end of the spool 16. The spool gear 40 has a series of teeth extending around the circumference of the gear 40. The spool gear 40 may be composed of a synthetic material. Alternatively, a spool gear may extend from both ends of the spool so that the spool is reversible.

A cylindrical cage 44 is rotatably retained in a housing in the tarp deployment machine 14. The cylindrical cage 44 includes a series of parallel shafts parallel 7 to and spaced from an axis shaft of the cylindrical cage.

A cage gear 46 extends radially from the cylindrical cage axis shaft. The cage gear 46 is rotatably driven by a drive mechanism. As seen in FIG. 8, the drive mechanism includes a continuous chain 48 which engages the cage gear 46 and is driven by a drive gear 50 powered by a hydraulic motor.

A pair of lower arms 54 each include a cradle 56 to receive the spool 16. The lower arms 54 are pivotally connected to the frame of the tarp deployment machine 14 and are raised and lowered by lower arm hydraulic cylinders.

A pair of upper arms 60 each include a recess 62 (visible in FIG. 8) to surround and retain the spool 16. The upper arms 60 are pivotally connected to the frame of the tarp deployment machine 14 and are moved by a pair of upper arm hydraulic cylinders 90.

When the hydraulic cylinders separate the upper and lower arms, the spool 16 may be removed and replaced.

Figure 9:
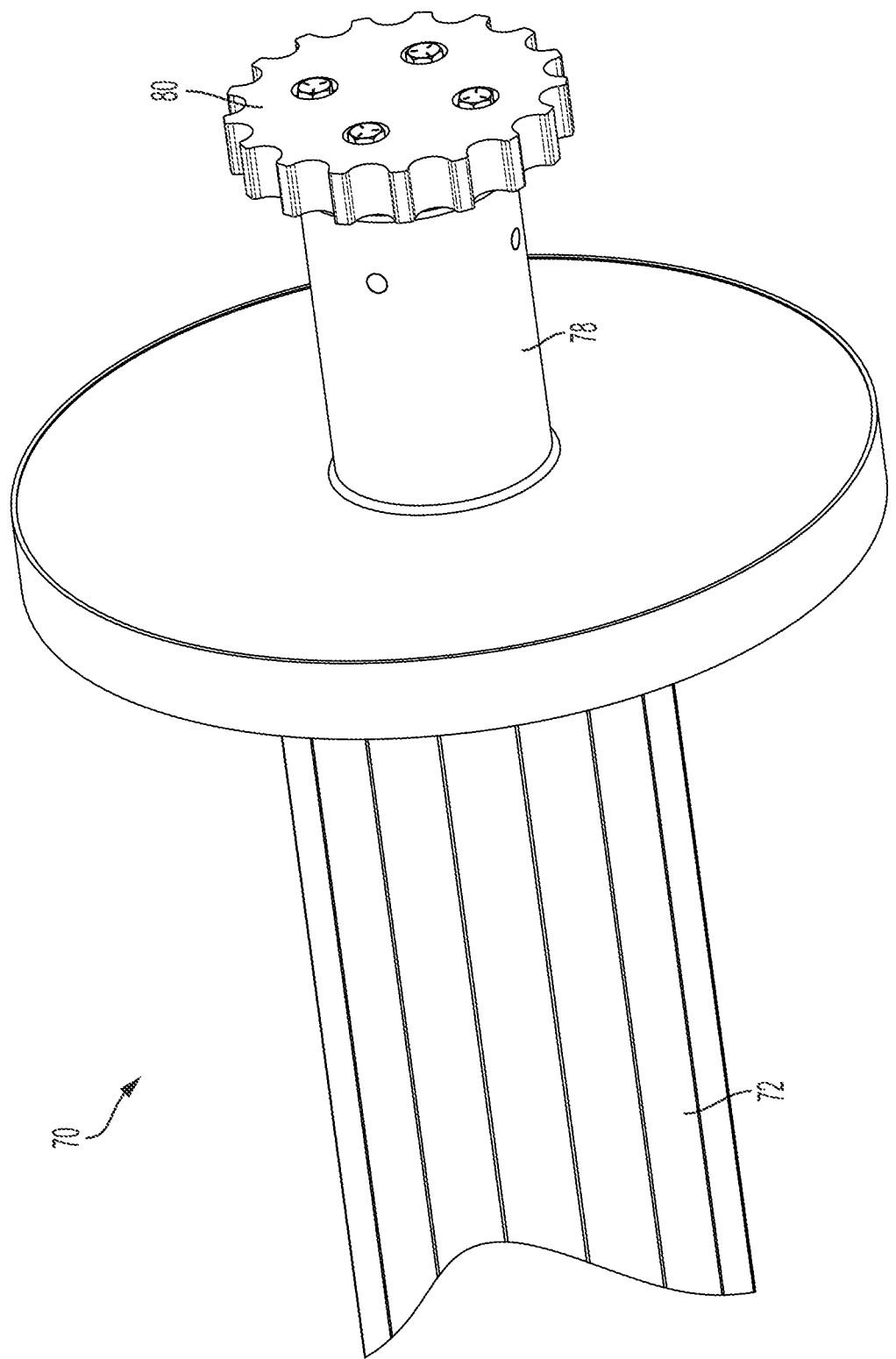
FIGS. 9 and 10 illustrate an alternate embodiment of the interchangeable tarp deployment system.
Figure 10:
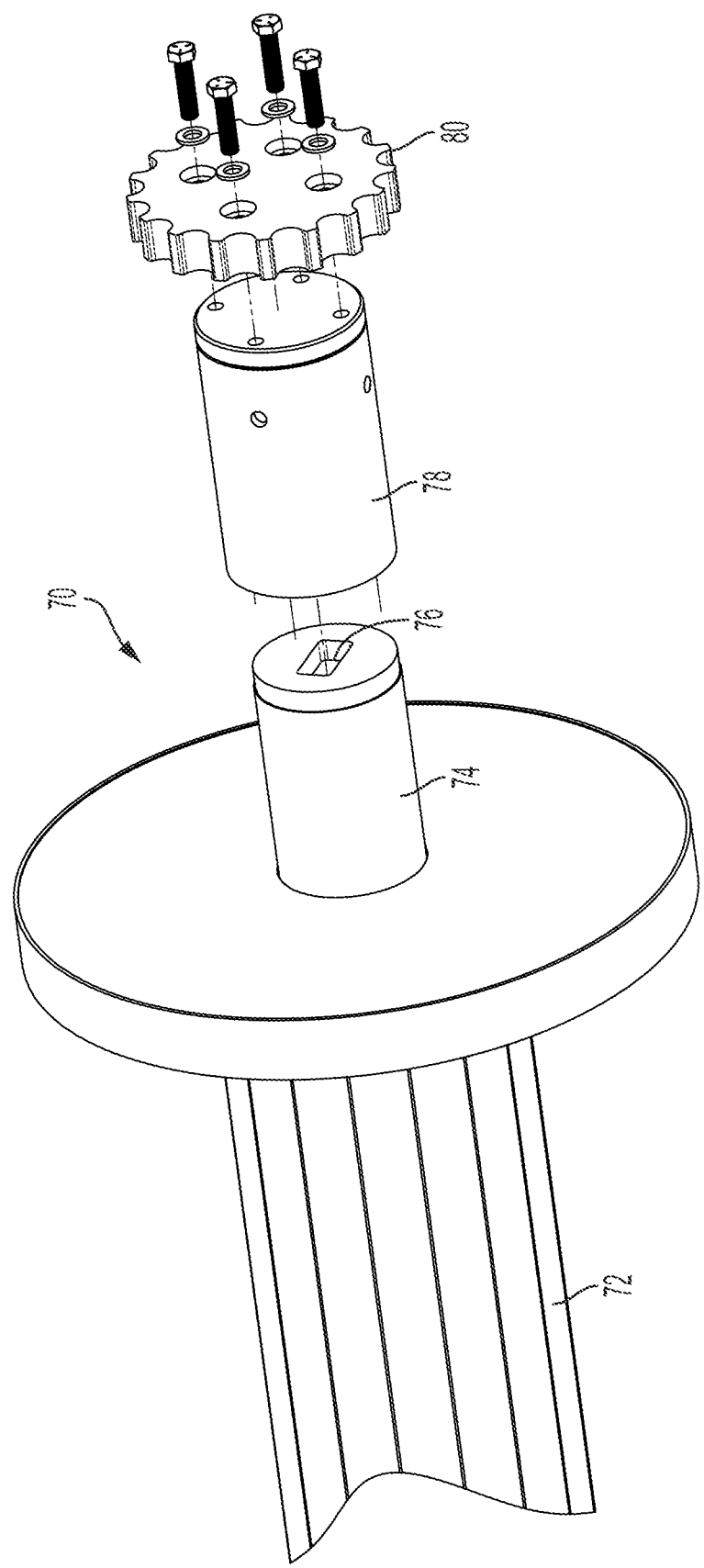

FIGS. 9 and 10 illustrate an alternate embodiment of the tarp deployment system 70 in order to accommodate and make compatible with a different spool 72. As best seen in the exploded view in FIG. 10, the spool 72 terminates in a cylindrical hub 74 having a recessed slot or drive bore 76 (seen in FIG. 10) to receive a drive lug or drive shaft (not shown) driven by a hydraulic motor.

A cylindrical cap 78 is secured over the spool end. A spool gear 80 is fastened to the cylindrical end cap 78 with a series of fasteners. As described above, the spool gear 80 engages the cylindrical cage 44. As in the previous embodiment, power is transmitted from a motor to a cage gear which rotates the cylindrical cage 44. The cylindrical cage engages and rotates the spool gear 80. Accordingly, the present system 70 is backward compatible to a spool 72 having a different configuration.

Use of the present invention facilitates mounting and dismounting a tarpaulin and its accompanying spool from the tarp deployment machine efficiently and safely with minimum effort.

Whereas, the invention has been described in relation to the drawings attached hereto, it should be understood that other and further modifications, apart from those shown or suggested herein, may be made within the scope of this invention.

What is claimed is:

1. An interchangeable tarp deployment system for unwinding and taking up a flexible tarpaulin, which system comprises:
   a tarp deployment machine;
   a spool configured to receive and retain a flexible tarpaulin;
   a spool gear extending radially from at least one end of said spool, wherein said spool gear is a spur gear;
   a cylindrical cage having a series of parallel shafts parallel to and spaced from an axis shaft of said cage, wherein said cylindrical cage is rotatably retained in a housing in said tarp deployment machine and wherein said cylindrical cage engages said spool gear;
   a cage gear extending from said cylindrical cage axis shaft; and
   a drive mechanism to drive said cage gear.

2. The interchangeable tarp deployment system as set forth in claim 1 wherein said spool is rotatably received in a pair of cradles in a pair of lower arms, said lower arms pivotally connected to said tarp deployment machine.

3. The interchangeable tarp deployment system as set forth in claim 2 wherein said lower arms are raised and lowered by lower arm hydraulic cylinders.

4. The interchangeable tarp deployment system as set forth in claim 1 wherein a pair of recesses in a pair of upper arms surround and retain said spool, said upper arms pivotally connected to said tarp deployment machine.

5. The interchangeable tarp deployment system as set forth in claim 4 wherein said pair of upper arms are moved by a pair of upper arm hydraulic cylinders.

6. The interchangeable tarp deployment system as set forth in claim 1 wherein said drive mechanism is a hydraulic motor mounted on said tarp deployment machine.

7. The interchangeable tarp deployment system as set forth in claim 1 wherein said tarp deployment machine is removably attachable to a powered vehicle.

8. The interchangeable tarp deployment system as set forth in claim 7 wherein said powered vehicle is chosen from a group consisting of a bulldozer, tractor, backhoe, and compactor.

9. The interchangeable tarp deployment system as set forth in claim 1 including a cylindrical cap adapter receivable over said at least one end of said spool wherein said spool gear is affixed to said cylindrical cap adapter.

10. The interchangeable tarp deployment system as set forth in claim 9 wherein said cylindrical cap adapter is removably affixed to said at least one end of said spool.

11. The interchangeable tarp deployment system as set forth in claim 1 wherein said series of parallel shafts surround said axis shaft.

* * * * *